United States Patent [19]

Self

[11] 4,068,683

[45] Jan. 17, 1978

[54] HIGH ENERGY LOSS DEVICE

[75] Inventor: Richard E. Self, Los Alamitos, Calif.

[73] Assignee: Control Components, Inc., Irvine, Calif.

[21] Appl. No.: 611,737

[22] Filed: Sept. 9, 1975

[51] Int. Cl.² .............................................. F16K 47/08
[52] U.S. Cl. ............................ 137/625.3; 137/625.37; 138/42; 251/127
[58] Field of Search ................ 137/625.3, 625.37, 549, 137/545; 251/127; 138/42, 43; 181/69, 60, 36 A

[56] References Cited

U.S. PATENT DOCUMENTS

| 3,513,864 | 5/1970 | Self | 137/625.3 X |
| 3,514,074 | 5/1970 | Self | 251/127 |
| 3,529,628 | 9/1970 | Cummins | 137/625.3 |
| 3,856,049 | 12/1974 | Scull | 251/127 X |
| 3,899,001 | 8/1975 | Orme | 137/625.3 |

*Primary Examiner*—Arnold Rosenthal

*Attorney, Agent, or Firm*—Vytas R. Matas; Joseph M. Maguire

[57] ABSTRACT

A more compact high energy loss device is provided having a series of uniquely formed multiturn labyrinth assemblies which reduce the pressure of a fluid flowing therethrough. The inlet of the labyrinth assemblies is formed according to a substantially circular configuration to have a predetermined inlet area while the outlet is formed according to a substantially scalloped configuration to provide an outlet area greater than the inlet area. The scalloped configuration of the outlet yields an outlet area which is also greater than if the outlet were of circular configuration. The scalloped outlet configuration also makes the labyrinth assembly less susceptible to circumferential thermal stresses resulting from high temperature fluids passing through the device producing high temperature inlet conditions and low temperature outlet conditions.

7 Claims, 11 Drawing Figures

HIGH ENERGY LOSS DEVICE

BACKGROUND OF THE INVENTION

1. Field of the Invention

The present invention generally relates to labyrinth devices which provide velocity control of high pressure flowing fluids, both liquids and gasses, and more particularly to such devices which provide a total outlet area substantially larger than the total inlet area.

2. Description of the Prior Art

In the handling of flowing high pressure fluids, it has been customary to utilize orifice means having a high velocity short throat section to attain energy losses or high pressure drops. If the fluid is in a liquid state and liable to flash, that is, vaporize or turn to a gaseous condition on the downstream side of the orifice or valve opening, it may condense implosively and induce damaging shock waves, cause erosion, and the like. Also, as the velocity of the fluid in the valve exceeds the velocity of the fluid in the line, several disturbing reactions occur. The most serious problem is rapid erosion of valve seat plug by direct impingement of the liquid and any foreign particles suspended therein. Additional erosion results from cavitation. Cavitation may be defined as the high speed implosion of vapor against the valve trim and body.

In addition to the severe problems resulting from erosion, the increased velocity also causes the flow characteristics of the valve to become unpredictable and erratic. This occurs because the changes in velocity significantly affect the valve vena contracta vortexes and fluid enthalpies.

Other objectionable problems created by the high fluid velocity in the valve are severe noise generation, trim fatique and possible degradation of flowing fluid materials such, for example, as polymers.

The foregoing and other deficiencies were somewhat overcome by more recent devices which affect dissipation of energy of a flowing high pressure fluid by subdividing it into a plurality of passageways and labyrinths in which there are rapid changes of direction. An example of such devices may be found in U.S. Pat. Nos. 3,514,074 and 3,513,864. These devices are formed as a series of cylindrically stacked members having inlets and outlets formed along concentric circular peripheries of each member with a labyrinth being formed therebetween. Where increased labyrinth outlet to inlet area ratios are required to provide a predetermined pressure drop through the device the circular outlet is appropriately increased by increasing the radius of each member to thereby increase the outlet area of the device. For high pressure drops the device becomes quite large and requires an increased amount of material and cost. Also, where a high temperature high pressure fluid is passed through such a device a significant temperature drop is encountered between the inlet and outlet due to the pressure drop through the device. This temperature differential may produce circumferential thermal stresses due to compressive forces on the high temperature inlet area and tensile stresses on the low temperature outet area which may cause the members of the device to split and warp. When the members split or warp the labyrinth they form may be shortcircuited thereby impairing the effectiveness and operation of the device. The foregoing problems become especially acute in atmospheric venting situations.

Atmospheric Venting is generally the noisiest of all control valve applications. The problem is difficult to treat because of the inherently higher pressure ratios, mass flow rates and the absence of the pipe wall as an attenuator. Fluid borne noise downstream of control valves is very high. If not treated or contained with the pipe, this noise can result in sound pressure levels of 150 to 170 dB three feet from the vent exit. Sound sources of this magnitude are hazardous to personnel and frequently result in complaints from local residents.

Mufflers and silencers can only attenuate fluid borne noise 20 to 30 dB. Therefore, only partial success has been achieved with them in obtained desired sound pressure levels. Furthermore, a typical path treatment system i.e., the muffler, lagging, support structure, etc., is very cumbersome and expensive. Often, the total cost of path treatment can exceed the valve cost many times over.

SUMMARY OF THE INVENTION

The discussed problems associated with the prior art devices along with other problems are effectively solved by the present invention which provides a compact high energy loss labyrinth device which provides a large outlet to inlet area ratio in a relatively small envelope which is less susceptible to cracking and warping from thermal stresses.

The device is formed as a rigid structure made up of a number of members joined together to have adjoining faces. Between these adjoining faces are formed a series of tortuous paths or labyrinths for conducting fluid flow therealong so as to provide a high energy loss to the fluid. The fluid enters these tortuous paths from a series of inlets formed along the periphery of a first geometrical configuration, usually circular, to provide a first total inlet area. The fluid is exhausted from the series of tortuous paths from a series of outlets formed along the periphery of a second geometrical configuration, such as a scalloped configuration, different from the first configuration to provide a second total outlet area greater than the first area. This different outlet configuration provides a more compact structure requiring less material than the prior art devices having concentric circular inlet and outlet configurations wherein the outlet area is a function of the radius of the outlet configuration. Since the scalloped outlet configuration allows a larger outlet area to be formed along its periphery than can be formed along the periphery of a circular envelope containing the scalloped configuration thermal stresses are significantly minimized.

From the foregoing it is thus seen that one aspect of the present invention is to provide a more compact high energy loss device than devices having concentric circular inlet and outlet configurations.

Another aspect of the present invention is to provide a high energy loss device being relatively free of thermal stress damage under high temperature inlet fluid conditions.

Yet another aspect of the present invention is to provide a high energy loss device especially useful for atmospheric venting conditions.

These and other aspects of the present invention will be more apparent after a review of the following description of the preferred embodiment when considered with the accompanying drawings.

BRIEF DESCRIPTION OF THE DRAWINGS

FIGS. 2 and 2a are top views of an upper disk of the stack of FIG. 1.

FIGS. 3 and 3a are top views of a lower disk of the stack of FIG. 1.

DESCRIPTION OF THE PREFERRED EMBODIMENT

Figure 1:
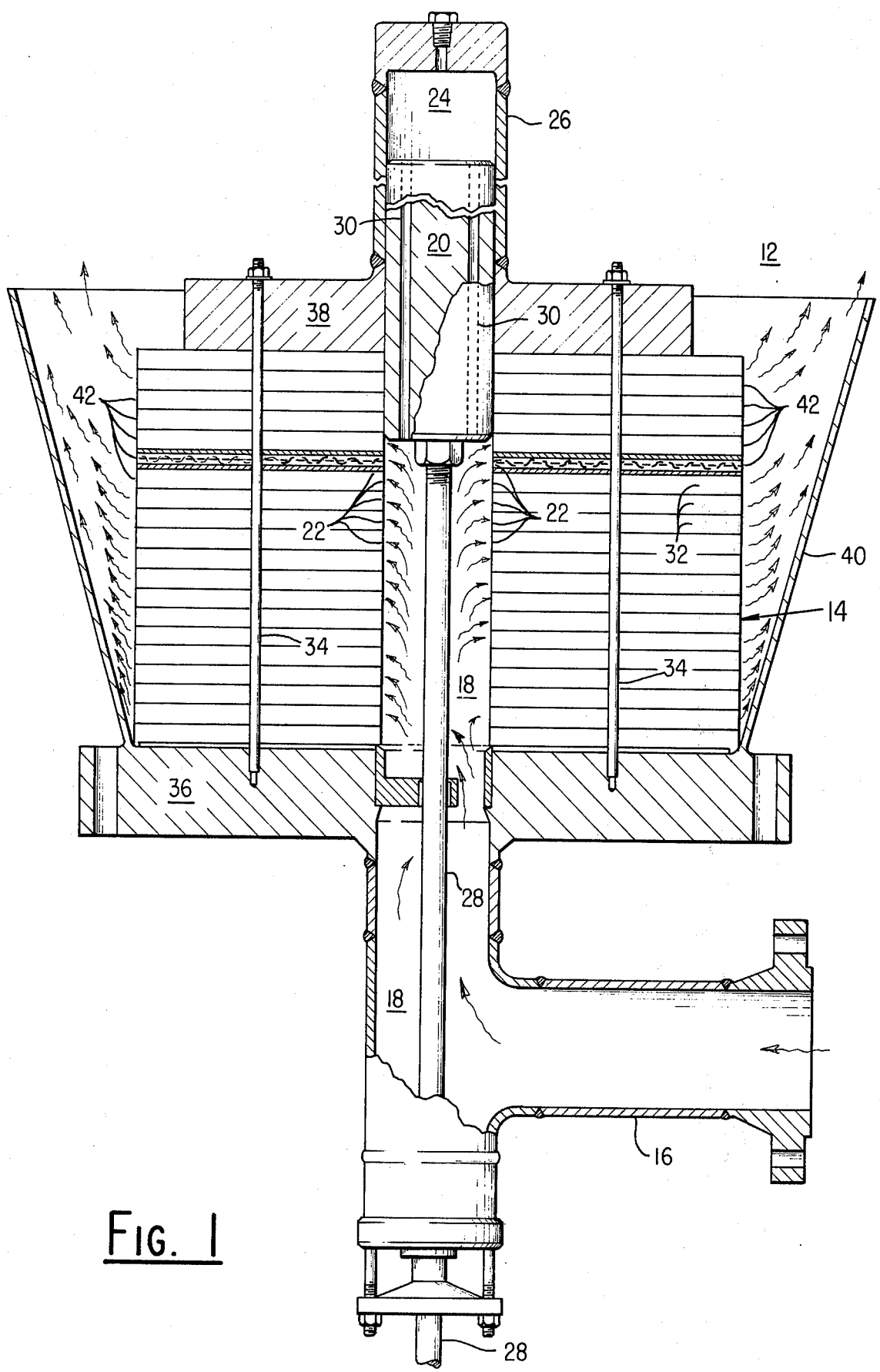
FIG. 1 is a longitudinal cross-section of an exhaust valve utilizing the high energy loss disk stack of the present invention.

Referring now to the drawings, FIG. 1 discloses a steam exhaust valve assembly 10 for exhausting a predetermined amount of steam to the atmosphere 12 though a multi-turn labyrinth stack assembly 14.

Steam enters the valve assembly 10 through an inlet 16 and flows into a chamber 18 from which a predetermined amount of the steam is allowed to exhaust through the stack assembly 14 by a movable valve plug 20. The valve plug 20 is movable between a first position completely blocking the steam from entering the stack assembly 14 by completely blocking all the inlets 22 of the stack assembly 14 and a second position opening all the inlets 22 by moving up into a space 24 formed by a top casing 26 of the valve assembly 10. The plug 20 is moved by a connecting rod 28 connected to an actuator (not shown) which is responsive to system control signals in a well-known manner. To minimize the force that the actuator has to exert to move the plug 20 between positions steam pressure is balanced across the plug 20 by providing a pair of passageways 30 extending longitudinally across the plug 20 for steam communication between the chamber 18 and the space 24.

The disk stack assembly 14 includes a series of individual disks 32 which are aligned with respect to the plug 20 and are clamped together by tension rods 34 between a bottom mounting plate 36 and a top mounting plate 38. A circumferential baffle 40 angularly extends from the bottom mounting plate 36 to encompass the stack assembly 14 and safely direct the steam exiting from outlets 42 of the stack assembly up into the atmosphere. The disk stack assembly provides a multi-turn labyrinth for the steam as it travels from the inlets 22 to the outlets 42 by means of variously configured disks 32 as will be disclosed later. The negotiation of these turns causes a significant pressure drop in the steam as well as a temperature decrease. To minimize the effects of this temperature difference between the inlets 22 and the outlets 42 the disks 32 are formed to have a scalloped or flower petal design outlet area configuration as may be best seen with reference to FIG. 2a.

Figure 2:
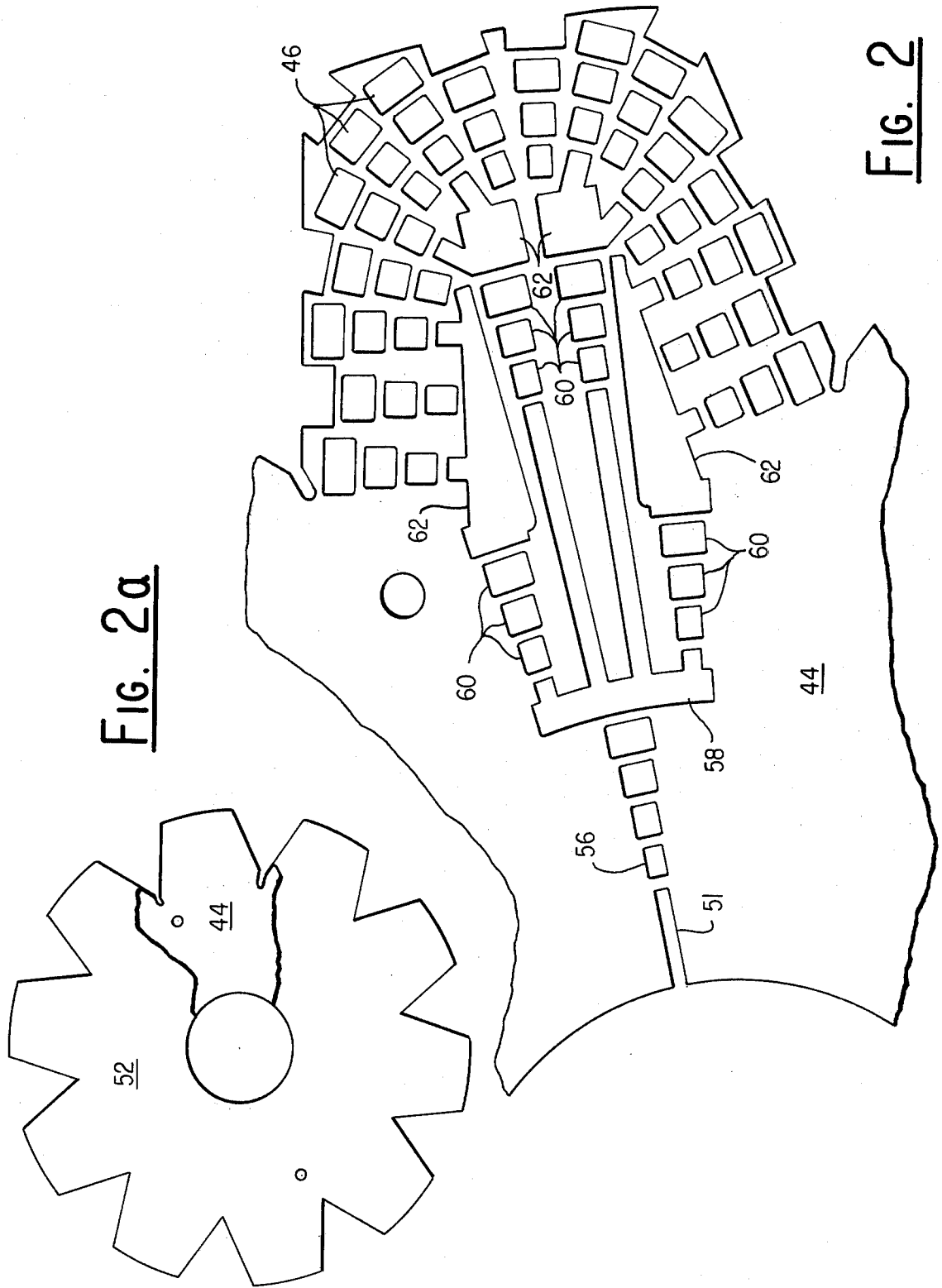
Figure 3:
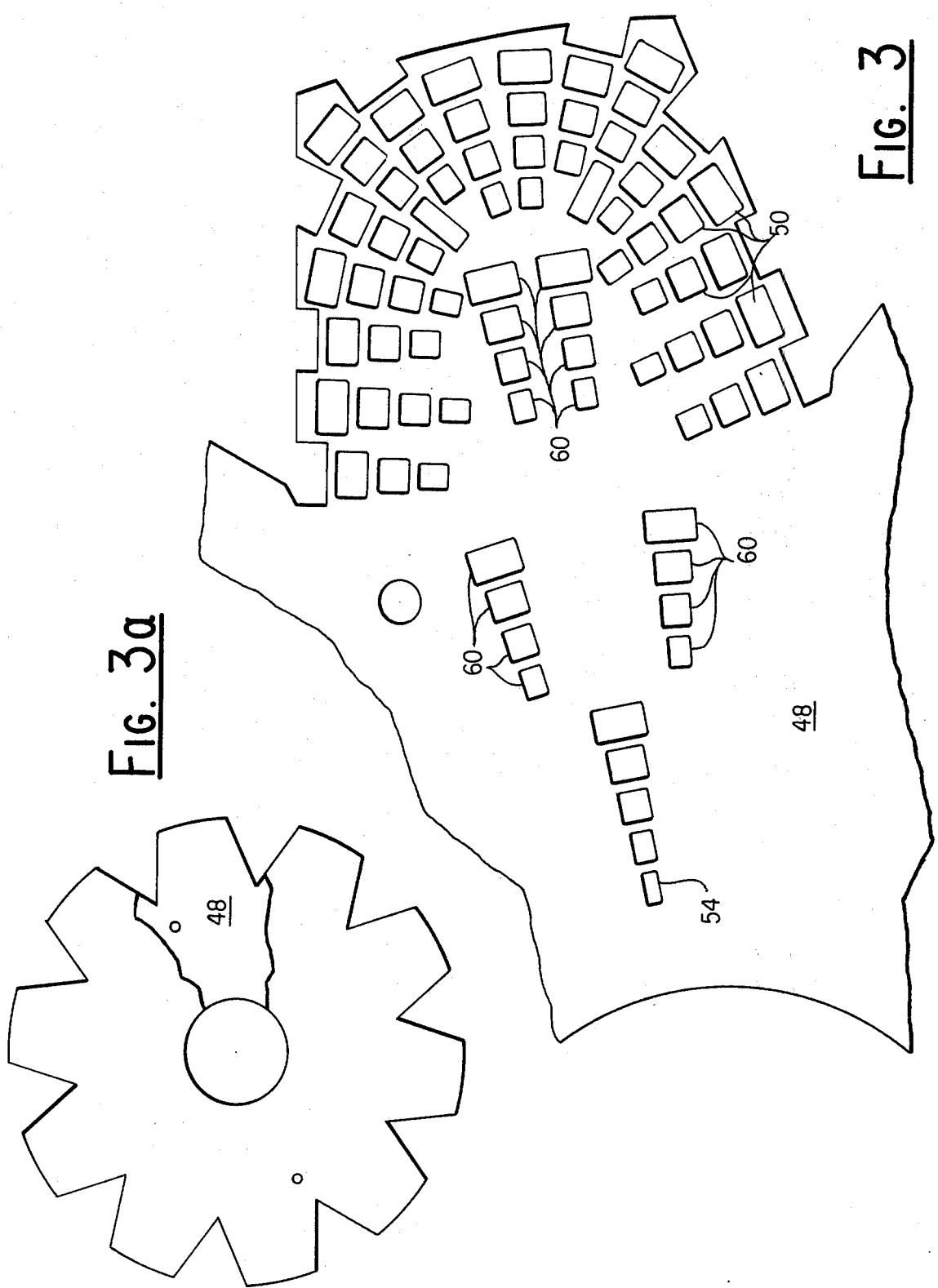
Figure 4:
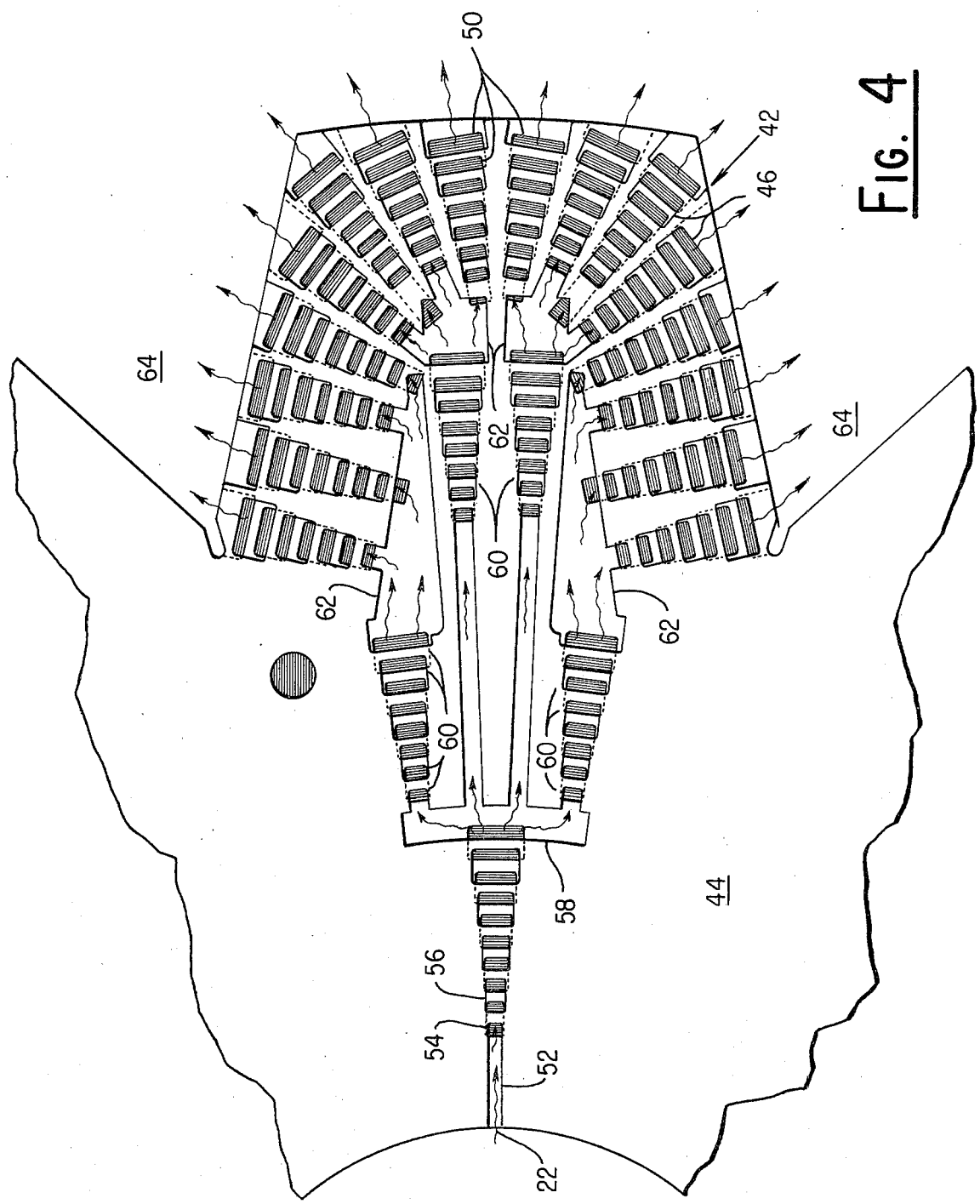
FIG. 4 is a top view of the upper and lower disks of FIGS. 2 and 3 fitted together to provide a multi-turn flow path.

Turning now to FIGS. 2, 3 and 4 it will be understood that the stack assembly 14 may be formed from stacking an upper perforated plate 44 having predetermined perforations 46 on a lower perforated plate 48 having perforations 50 which partially overlap the individual perforations 46, as is shown in FIG. 4. When solid non-perforated plates 52 are mounted on top of the upper plate 44 and on the bottom of plate 48 steam flow is restricted to flow between the plates 44 and 48. The flow progresses along an inlet perforation 51 of plate 44 down to a perforation 54 on plate 48 and back up to the plate 44 through perforation 56. This alternate flow between adjacent perforation of the plates 44 and 48 progresses until a dividing perforation 58 is reached on plate 44. The same multi-turn flow between plates 44 and 48 is then continued along a series of paths defined by overlapping perforations 60 on plates 44 and 48. The paths defined by the perforations 60 terminate in more dividing perforations 62 formed in plate 44 which again subdivide the steam flow into more paths defined by overlapping perforations 46 and 50 in respective plates 44 and 48. The linearly aligned perforations are formed to be of increasing area as they extend toward the outlets 42 to provide gradual expansion chambers for steam flow. As was mentioned, each disk 52, 44, and 48 is identically notched or scalloped as in area 64 to provide an increased outlet area for steam flow than would be provided by a circular outlet area defined around the furthest extension of the notches or scallops. This allows a material savings in the manufacture of disks requiring a predetermined pressure drop as determined by the inlet to outlet area ratio. The more compact design also provides a more even temperature distribution across the disks 52, 44, and 48 and helps prevent disk warping which would short circuit the predetermined multi-turn paths defined by the overlapping perforations.

Figure 5:
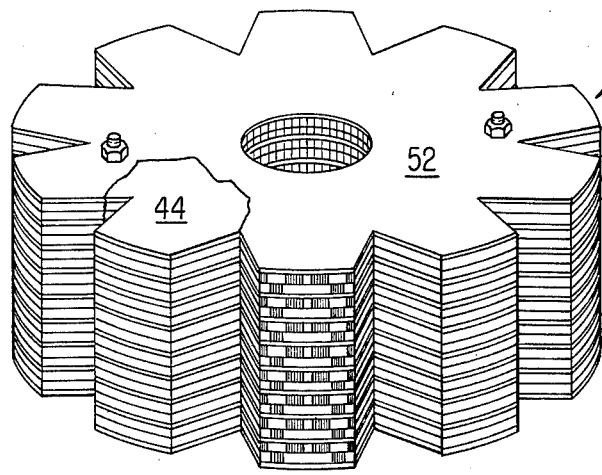
FIG. 5 is a perspective view of the disk stack of FIG. 1.
Figure 6:
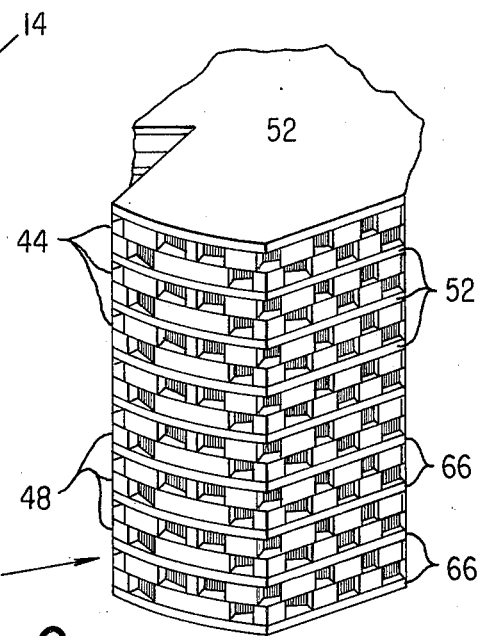
FIG. 6 is an enlarged view of the outlet of the FIG. 5 disk stack.

As may be seen in FIGS. 5 and 6 the plates 52, 44 and 48 form a four-plate assembly 66, any number of which may be stacked together to form the stack assembly 14. When stacking such four-plate assemblies 66, the solid plates 52 located internally of the stack assembly 14 may be made to seal not only the bottom plates 48 but also the top plates 44 of the adjacent four-piece assemblies 66.

Figure 7:
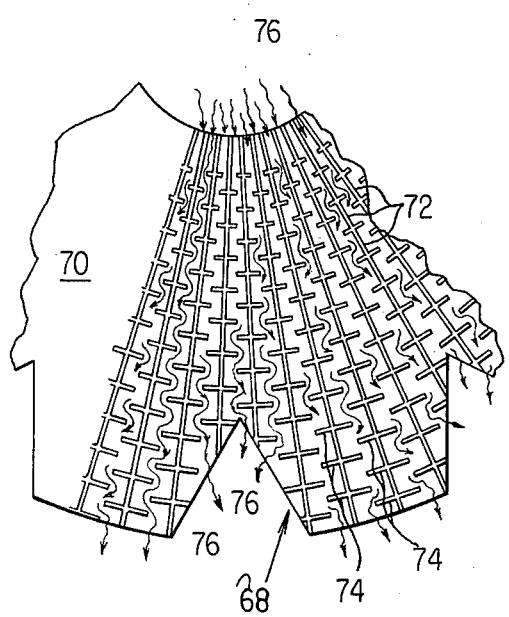
FIG. 7 is a top view of an alternate disk which may be used to form the disk stack of FIG. 1.

Referring now to FIG. 7 it will be seen that the stack assembly 14 could alternately be formed from non-perforated disks 68 which have a smooth solid bottom side (not shown) and an opposite side 70 on which a series of radially extending fence structures 72 are formed to raisedly extend up from the face 70. Each fence structure 72 has a series of spaced dividers 74 which overlap to define a multi-turn path 76 for steam flow between adjacent fence structures 72. The turns are negotiated within the plane of the disk side 70. To form the disk stack assembly 14 from non-perforated disks 68 the same disks 68 are stacked together with the bottom flat side of one disk 68 resting against the fence and divider structures 72 and 74 of the adjacent disk 68 to thereby seal the paths 76 between themselves. The uppermost disk may be sealed by either the flat disk 52 or by resting it against either of the valve plates 36 and 38 shown in FIG. 1. Clearly the outlet occurs along the entire scalloped area thereby providing a more compact assembly which is less expensive and not as susceptible to temperature induced problems. It will also be understood that the illustrated fence structure 72, 74 could be also formed according to patterns illustrated in FIGS. 2 through 5 of U.S. Pat. No. 3,514,074 or to the patterns and teachings of FIGS. 2 through 7 of U.S. Pat. No.

3,513,864 by fitting the forementioned patterns to the scalloped disk configuration of the present invention.

Figure 8:
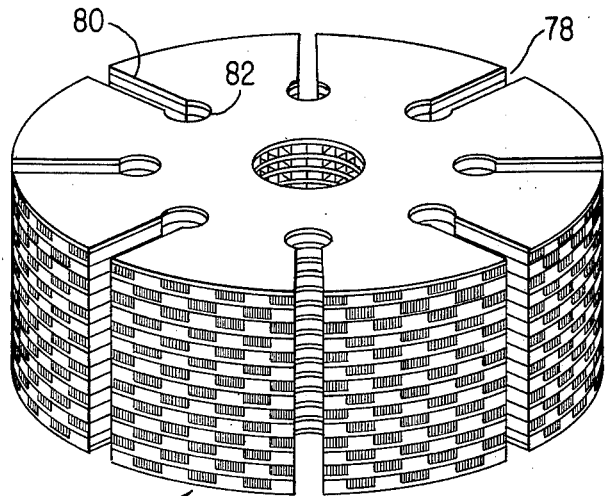
FIG. 8 is a perspective view of an alternate disk stack configuration.
Figure 9:
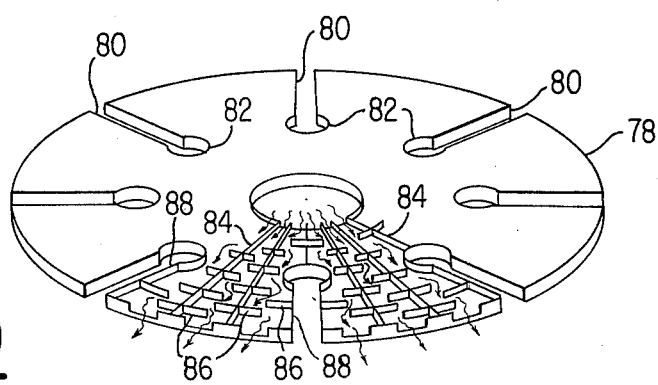
FIG. 9 is a top view of one disk of the disk stack of FIG. 8.

Turning next to FIGS. 8 and 9 an alternate disk design is shown which was found to effectively eliminate thermal stress problems in disk stacks. A disk 78 is formed to have a series of notches 80 which terminate in circular areas 82. A series of fence structures 84 with dividers 86 are formed on one side of the disk 78 in a manner similar to the FIG. 7 embodiment. The notches 80 and the circular areas 82 have a wall 88 which prevents steam flow from exiting therethrough. However parts on all of the walls 88 could be easily deleted to provide an increased outlet area from the same disk 78.

The disks 78 are stacked together in a stack assembly 90 by placing the flat surface of one disk 78 against the fence and divider 84, 86 side of the adjacent disk 78. The uppermost disk 78 may then be sealed by placing its fence structure 84 against either of the valve plates 36 and 38 shown in FIG. 1 to provide a more compact steam exhaust valve assembly 10.

Certain modifications and improvements will occur to those skilled in this art area upon review of this specification. It will be understood that such modifications and improvements were deleted herein for the sake of conciseness and readability but that they are within the scope of the following claims.

What I claim is:

1. A high energy loss fluid flow controlling device comprising:
    a plurality of members having aligned scalloped outer peripheries and being joined together into a rigid structure having a scalloped outer periphery continuously extending along the height of the rigid structure, said rigid structure having a series of high energy loss paths for fluid flow formed by said plurality of members;
    inlet means centrally cut in each of said members according to a first geometrical configuration to define an inlet area for conducting fluid to the series of paths formed in said rigid structure by said plurality of members; and
    scalloped outlet means formed along the entire scalloped outer periphery of said rigid structure to define a continuous scalloped outlet area along the entire height of said rigid structure.

2. A high energy loss device as set forth in claim 1 wherein said inlet means includes a substantially circular bore extending through said plurality of members to provide a series of openings for fluid flow into the high energy loss path of said rigid structure.

3. A high energy loss device as set forth in claim 2 wherein said plurality of members includes a series of disks having abutting surfaces and forming high energy loss paths therebetween for fluid flow therealong.

4. A high energy loss device as set forth in claim 3 wherein said series of disks includes:
    a first disk having a plurality of openings formed therein according to a first predetermined pattern;
    a second disk abutting said first disk and having a plurality of openings formed therein according to a second predetermined pattern so as to overlap the openings of said first predetermined pattern to allow the fluid to flow back and forth between said first and second disk as the fluid flows between the inlet and the outlet of said device.

5. A high energy loss device as set forth in claim 4 wherein said series of disks further includes a pair of blank plates between which said first and second disks are stacked to prevent leakage from said first and said second disk.

6. A high energy loss device as set forth in claim 3 including a plug member movable within the bore of said rigid structure to vary the inlet area exposed to fluid flow through said rigid structure.

7. A device for providing high energy loss in fluids flowing therethrough comprising:
    a rigid structure having a series of members joined together to have adjoining faces, each of said series of members having a central opening and a scalloped outer periphery, the central openings and scalloped outer peripheries of each member being aligned with each other in the rigid structure to provide a continuous central opening and a continuous scalloped outer periphery along the entire height of said rigid structure;
    a series of tortuous paths for fluid flow therealong being formed between at least a pair of the adjoining faces of said series of members between the central opening and the scalloped outer periphery of the rigid structure;
    inlet means formed in the aligned central opening of the rigid structure to provide an area for inleting fluid into said series of tortuous paths; and
    scalloped outlet means formed in the scalloped outer periphery of said rigid structure to provide an outlet area along the scalloped periphery of said rigid structure for exhausting fluid from said series of tortuous paths.

* * * * *